(12) United States Patent
Bliss

(10) Patent No.: US 8,107,179 B2
(45) Date of Patent: *Jan. 31, 2012

(54) MAGNETIC DISK DRIVE, SERVO WRITER, SELF-SERVO WRITER AND METHODS FOR USE THEREWITH

(75) Inventor: William Gene Bliss, Thornton, CO (US)

(73) Assignee: Broadcom Corporation, Irvine, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/612,404

(22) Filed: Nov. 4, 2009

(65) Prior Publication Data

US 2010/0046107 A1    Feb. 25, 2010

Related U.S. Application Data

(63) Continuation of application No. 11/728,683, filed on Mar. 26, 2007, now Pat. No. 7,633,697.

(60) Provisional application No. 60/813,113, filed on Jun. 12, 2006.

(51) Int. Cl.
  *G11B 5/09* (2006.01)
(52) U.S. Cl. .......................................................... 360/49
(58) Field of Classification Search .................... 360/49, 360/77.05, 48, 40, 51
  See application file for complete search history.

(56) References Cited

U.S. PATENT DOCUMENTS 7,633,697 B2 * 12/2009 Bliss ................................ 360/49
7,667,910 B2 *  2/2010 Bliss ................................ 360/49

* cited by examiner

*Primary Examiner* — Fred Tzeng
(74) *Attorney, Agent, or Firm* — Garlick Harrison & Markison; Bruce E. Stuckman

(57) ABSTRACT

A servo writer includes a servo data generation module that generates servo data corresponding to a plurality of servo wedges and a plurality of tracks of a disk, the servo data including track identification data that is repetition coded. A servo write module writes the servo data on the disk.

16 Claims, 10 Drawing Sheets

MAGNETIC DISK DRIVE, SERVO WRITER, SELF-SERVO WRITER AND METHODS FOR USE THEREWITH

CROSS REFERENCE TO RELATED PATENTS

The present application claims priority from the Provisional Patent Application No. 60/813,113, entitled, "MAGNETIC DISK DRIVE, SERVO WRITER AND METHODS FOR USE THEREWITH," filed on Jun. 12, 2006, and the further claims priority under 35 USC 120 as a continuation of application Ser. No. 11/728,683, entitled, "MAGNETIC DISK DRIVE, SERVO WRITER AND METHODS FOR USE THEREWITH," filed on Mar. 26, 2007, the contents of which are expressly incorporated herein in their entirety by reference thereto.

BACKGROUND OF THE INVENTION

1. Technical Field of the Invention

The present invention relates to formatters, disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

As a magnetic hard drive is manufactured portions of the disk are prerecorded at the factory. Servo data is recorded on the disk in a plurality of servo wedges that are contained in radial segments about the disk. For each track on the disk, each servo wedge contains a servo field that is recorded with a preamble, a synchronization mark (sometimes called a Servo Address Mark or SAM), and servo data. Examples of servo data include, servo wedge number, servo track number, head number, and burst data used by a disk controller to control the rotation of the disk and the position of the read/write heads of the disk drive. This burst data is traditionally coded with a so called '2T' pattern of repeating 1100 that is longitudinally or perpendicularly recorded on the magnetic medium of the disk.

A sizable market has developed for these devices and the price per unit of storage has steadily dropped. Modem host devices are provided with greater storage capacity at reduced cost, compared with devices that where manufactured a few years earlier. The need exists for provide hard drives that can be manufactured efficiently on a mass scale with high accuracy and greater storage capacity.

SUMMARY OF THE INVENTION

The present invention sets forth a magnetic disk drive, servo writer or self-servo writer and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
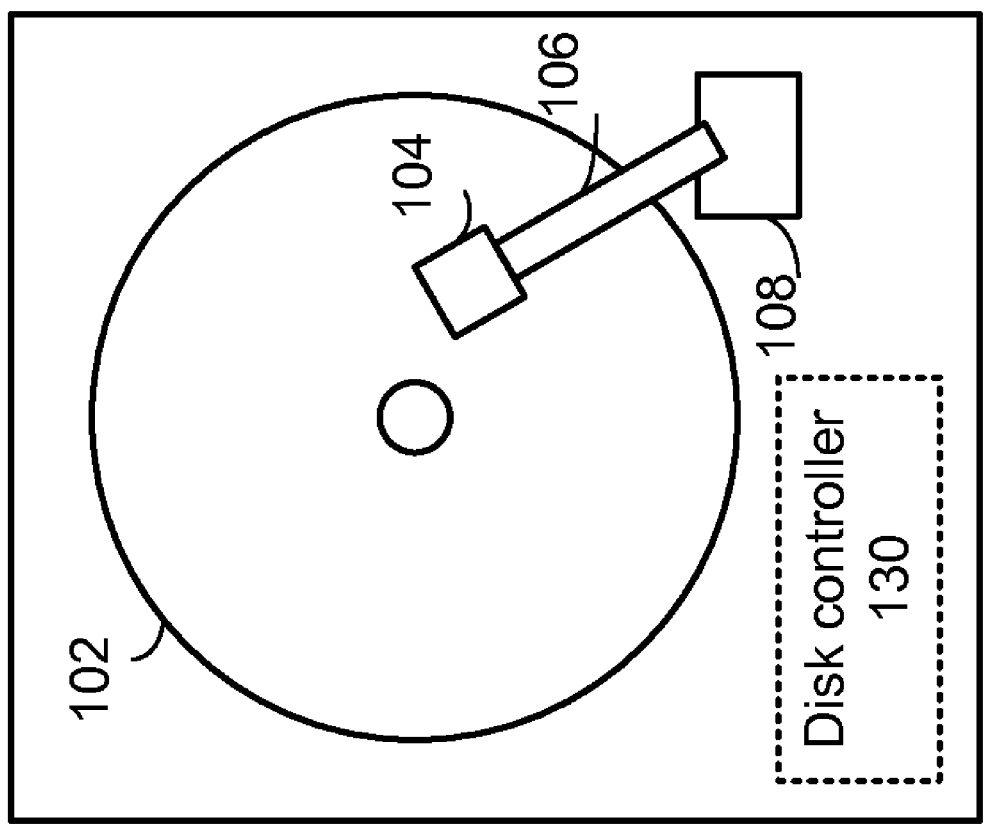
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. In an embodiment of the present invention, the read/write heads 104 include a write element, such as a monopole write element that writes data on the disk with perpendicular magnetic recording (PMR). This allows for greater recording density and greater storage capacity for the drive. However, other recording configurations can likewise be used within the broad scope of the present invention.

A disk controller 130 is included for controlling the read and write operations to and from the drive, for controlling the speed of the servo motor and the motion of actuator 108, and for providing an interface to and from the host device.

Disk 102 is prerecorded with servo data in accordance with one or more functions or features of the present invention, as described in further detail in conjunction with the figures that follow.

Figure 2:
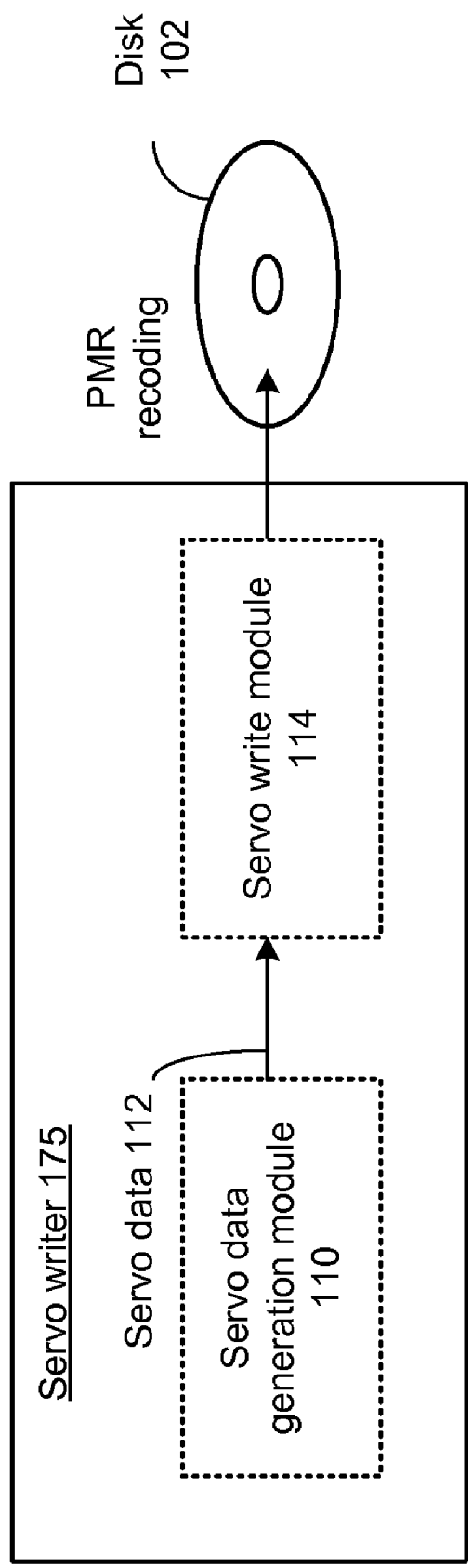
FIG. 2 presents a block diagram representation of a servo writer 175 in accordance with an embodiment of the present invention.

FIG. 2 presents a block diagram representation of a servo writer, or equivalently self-servo writing, 175 in accordance with an embodiment of the present invention. In particular, servo writer 175 includes a servo data generation module 110 that generates servo data 112 corresponding to a plurality of servo wedges and a plurality of tracks of a disk, such as disk 102. The servo data 112 includes track identification data that indicate the particular track of data. In an embodiment of the present invention, this track identification data is wide biphase coded. It should be noted that track identification can be simply binary coded, Gray-coded so that adjacent tracks on the disk have track identification data that varies by only one bit, or otherwise encoded with a unique identifier for each track. The track identification data is then (n,1) repetition coded by replicating each bit of the gray coded track identification data with (n) identical data bits for recording, such as by PMR, on the magnetic media by servo write module 114.

The operation of servo writer 175 can be further described in terms of the example that follows. Consider the servo data corresponding to a particular servo wedge and tracks 13 and 14 of the disk that includes a 16-bit track identification field that is Gray coded wide biphase coded and (4,1) repetition coded. The binary coded, Gray coded, wide biphase coded and repetition coded data can be represented as follows:

|  | Track 13 | Track 14 |
| --- | --- | --- |
| 16-bit binary | 0000000000001101 | 0000000000001110 |
| Gray code | 0000000000001011 | 0000000000001001 |
| Wide BiPhase encoded | 0011 0011 0011 0011 | 0011 0011 0011 0011 |
|  | 0011 0011 0011 0011 | 0011 0011 0011 0011 |
|  | 0011 0011 0011 0011 | 0011 0011 0011 0011 |
|  | 1100 0011 1100 1100 | 1100 0011 0011 1100 |
| (4,1) Repetition enCoded | 0000 0000 0000 0000 | 0000 0000 0000 0000 |
|  | 0000 0000 0000 0000 | 0000 0000 0000 0000 |
|  | 0000 0000 0000 0000 | 0000 0000 0000 0000 |
|  | 1111 0000 1111 1111 | 1111 0000 0000 1111 |

In this example, a (4,1) repetition code is used that uses n=4 identical bits to represent each bit of the Gray coded track identification field. In this fashion, each 1 is coded as 1111 and each 0 is coded as 0000. Each bit of the resulting track identification data is written, such as by PMR, on the disk. In an embodiment, zero inter-symbol interference signaling is employed with pulses such as finite sinc pulses, raised cosine, sinusoidal roll-off, etc. however, other waveforms including partial response or equalized partial response pulse can likewise be employed.

The added redundancy employed by the repetition code, increases the likelihood that each bit will be correctly read during the operation of the disk drive, increases the signal to noise ratio providing greater accuracy for the timing and control functions of disk controller 130. In addition, this 1/n rate code provides greater tolerance of potential radial incoherence between tracks. Further details regarding the decoding and use of the track identification data will be presented in conjunction with FIGS. 6-7.

In addition, servo data 112 include burst data that indicate the track alignment of the read head. In an embodiment of the present invention, this track identification data includes an alternating data pattern that is then repetition coded by replicating each bit of the alternating data pattern into (n) identical data bits for recording, such as by PMR, on the magnetic media by servo write module 114.

The operation of servo writer 175 can be further described in terms of the example that follows. Consider a data burst of length 64 that includes an alternating bit pattern that is repetition coded. The repetition coded burst data can be represented as follows:

| | |
| --- | --- |
| Alternating data stream | 01010101 . . . |
| (4,1) repetition coded burst data | 0000 1111 0000 1111 0000 1111 0000 1111 |
| | 0000 1111 0000 1111 0000 1111 0000 1111 |

While the example above uses (4,1) repetition coding, other (n,1) repetition codes, such as (2,1), (3,1) or greater values of n, such as n=8, 16, 32, etc., can also be employed in accordance with an embodiment of the present invention. Similarly, the 64-bit data field used for the burst could be larger or smaller, depending on the particular implementation.

The further operation of servo writer 175 will be explained more fully in association with FIGS. 3-5 that follow.

Figure 3:
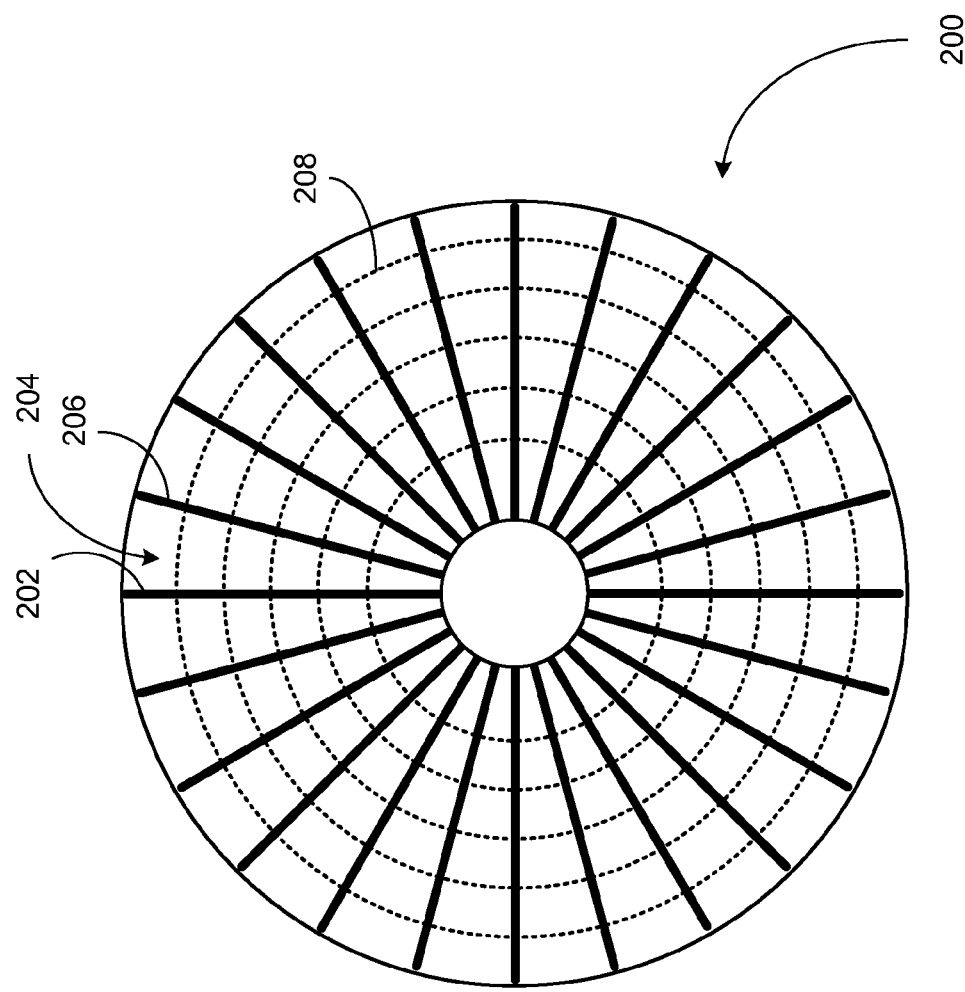
FIG. 3 presents a pictorial representation of a disk 200 having a plurality of servo wedges and a plurality of tracks in accordance with an embodiment of the present invention.

FIG. 3 presents a pictorial representation of a disk 200 having a plurality of servo wedges and a plurality of tracks in accordance with an embodiment of the present invention. In particular, disk 200, such as disk 102, is recorded by servo writer 175 with 24 radial servo wedges, including adjacent servo wedges 202 and 206. While the servo wedges are represented as linear, non-linear configurations including arcs can also be employed, particularly when disk 200 is implemented in a disk drive, such as disk drive unit 100 that includes an arm 106 that is moved by actuator 108 over the surface of the disk 200 by rotation. Further, while 24 servo wedges are shown, greater numbers of servo wedges, such as several hundred or more can be employed.

Five tracks, including track 208, are shown for illustrative purposes, however, a far greater number of tracks would be employed in an actual implementation. Each servo wedge includes a servo field associated with each track. One or more sectors of user or control data are stored along the track between consecutive servo wedges. Further details regarding the contents of a servo field are presented in conjunction with FIG. 4.

Figure 4:
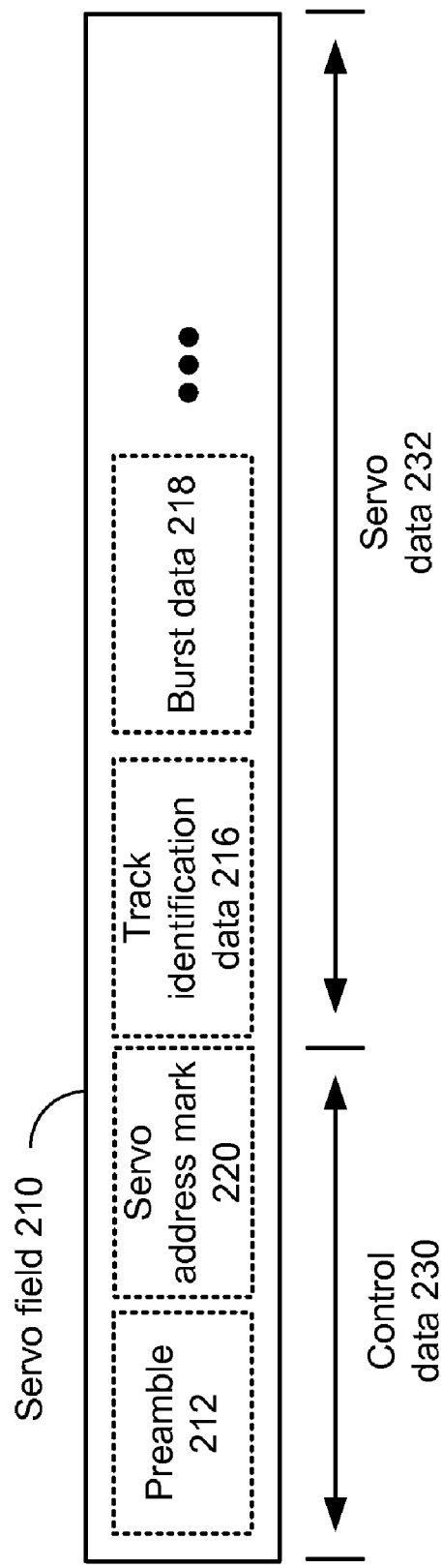
FIG. 4 presents a block diagram representation of a servo field 210 in accordance with an embodiment of the present invention.

FIG. 4 presents a block diagram representation of a servo field 210 in accordance with an embodiment of the present invention. In particular, a servo field typically begins with control data 230 that includes a preamble 212 and synchronization mark 220, typically called a Servo Address Mark or SAM that allows the disk controller to recognize the beginning of the servo field 210 and beginning of the servo data 232, and can also be used for timing generation in the disk controller 130 to time the start time for various events, such as write operations, synchronous identification of a servo wedge during spin-up of the disk, etc. An index mark can optionally be included in control data 230 to indicate a particular servo wedge that is the first or "index" wedge for easy decoding by the disk controller 130. Servo data 232 includes track identification data 216 for identifying the particular track being read, burst data 218 for providing subtrack head alignment data that facilitates control to a track centerline and to facilitate track seek movements of the read/write head, etc. While not shown, the servo data can also include other data including a head number for a multi-head disk drive, and a wedge number that identifies the current wedge, etc.

Figure 5:
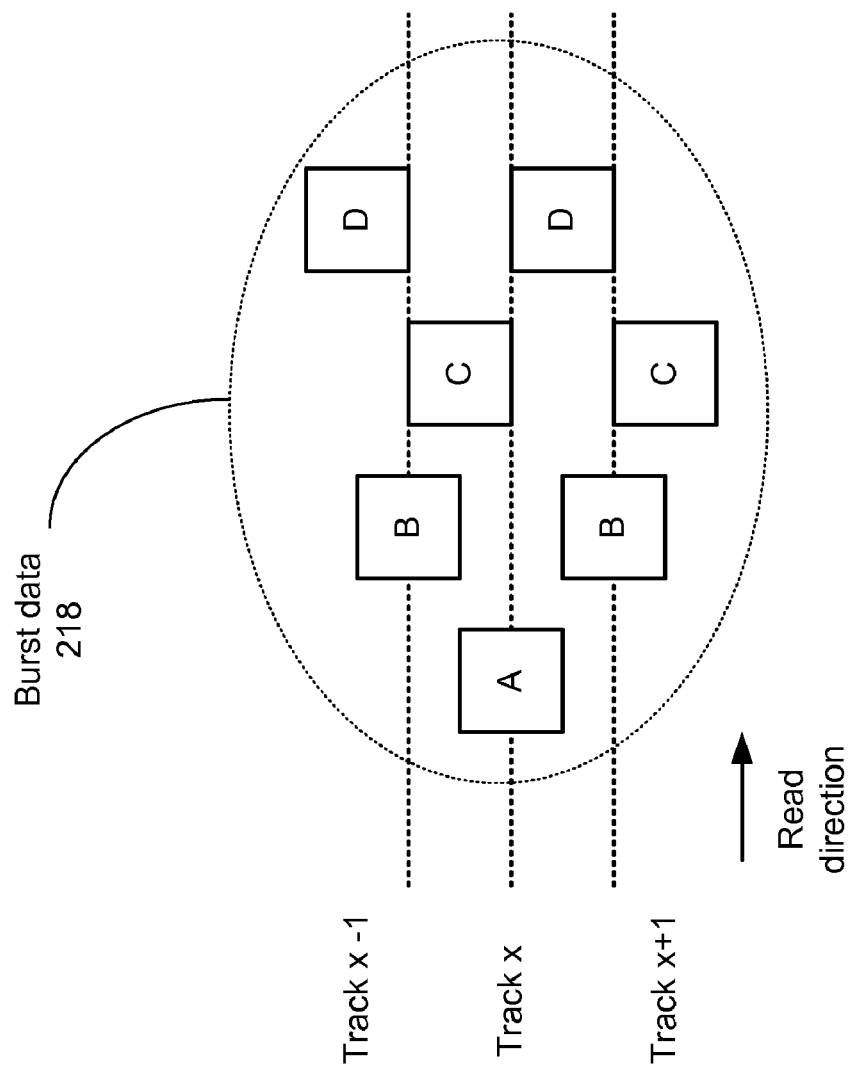
FIG. 5 presents a pictorial representation of a burst data field 220 over several tracks in accordance with an embodiment of the present invention.

FIG. 5 presents a pictorial representation of a burst data field this is 218 over several tracks in accordance with an embodiment of the present invention. The burst data fields 220 are shown for three adjacent tracks, track x−1, x, and x+1. In particular, the burst data fields 218 include centerline bursts A and B and off-track bursts C and D during successive burst regions that are used for subtrack location and control by disk controller 130. This system is commonly called 'Quadrature Servo' because of the 4 different burst fields. This system can be extended to more or less than 4 burst fields. An alternate system that has no blank 'interstial areas' (areas without a written burst) called 'Null Servo' can also be used with this invention. For example, if a read head moves along the centerline of track x, it passes over burst A, misses bursts B from tracks x−1 and x+1 and reads equal but lesser portions of off-track bursts C and D. In the event that the signal from the read head resulting from burst C, is greater than the signal from burst D, the read head is aligned slightly toward burst C—above the centerline of track x. Using the track identification data and the decoded burst data, including the relative magnitudes of the data read is response to the A, B, C and D data bursts allows the disk controller 130 to accurately determine the position of the read head. In accordance with the present invention, one or more of the data bursts A, B, C and D are implemented with a repetition coded alternating data stream as discussed in conjunction with FIG. 2. While the foregoing description includes a four data burst 218, A, B, C & D, a greater or lesser number of data bursts may likewise be implemented in accordance with the present invention. In addition, other embodiments can likewise employ other burst patterns including null servo patterns within the broad scope of the present invention.

Figure 6:
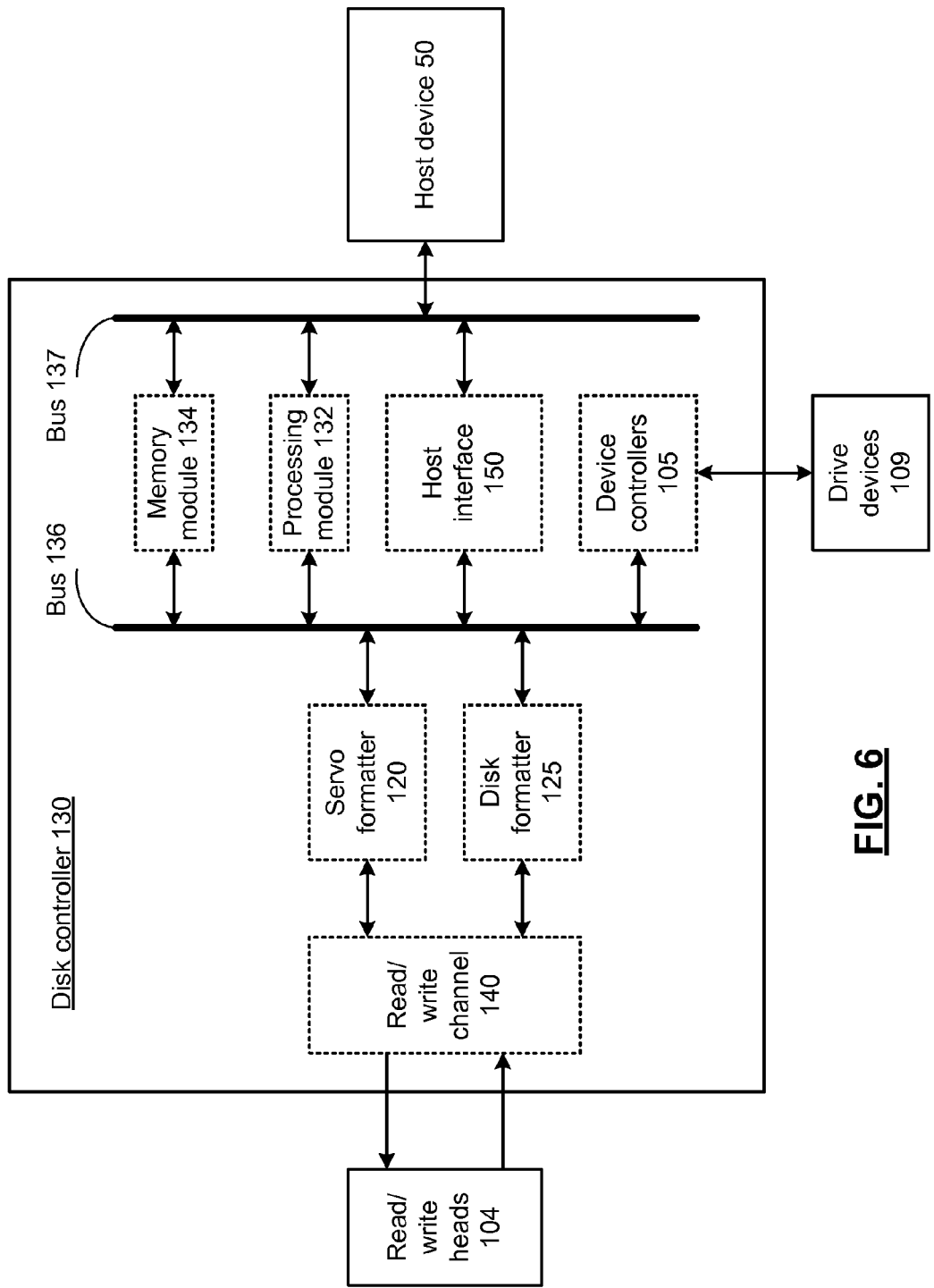
FIG. 6 presents a block diagram representation of a disk controller 130 in accordance with an embodiment of the present invention.

FIG. 6 presents a block diagram representation of a disk controller 130 in accordance with an embodiment of the present invention. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102 servo formatter 120 provides clock signals and other timing signals based on servo control data read from disk 102, device controllers 105 control the operation of drive devices 109 such as actuator 108 and the servo motor, etc. Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

Figure 7:
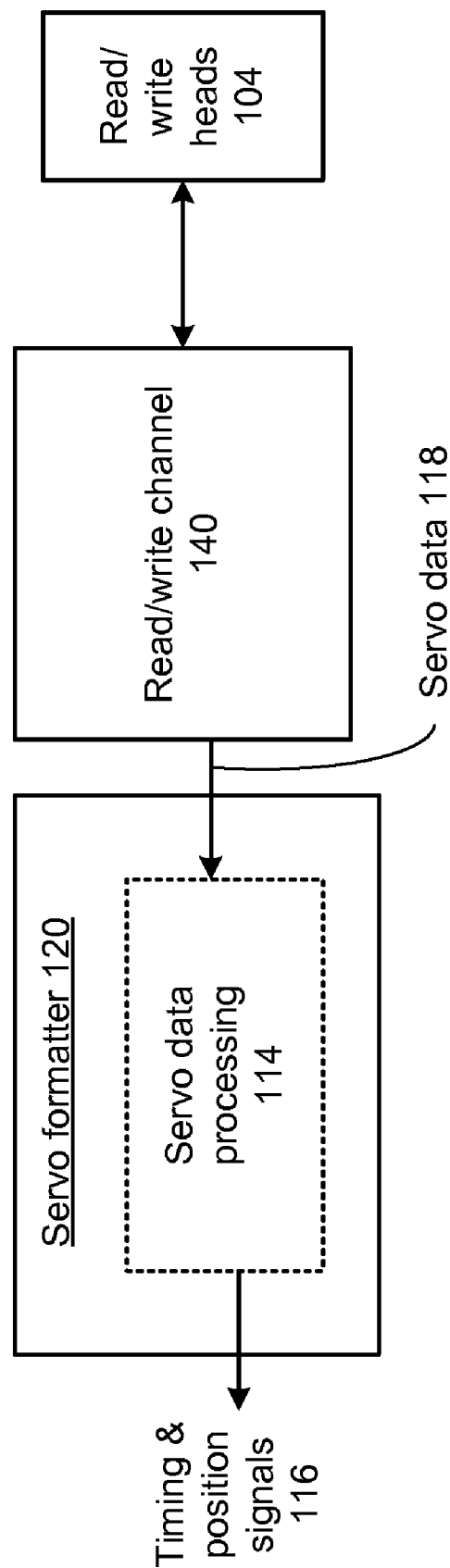
FIG. 7 presents a block diagram representation of a servo formatter 120 in accordance with an embodiment of the present invention.

FIG. 7 presents a block diagram representation of a servo formatter 120 in accordance with an embodiment of the present invention. In particular, read/write channel 140 is operably coupled to the read/write head to read the servo data 118 from the disk. Servo formatter 120 is operably coupled to the read/write channel 140 to generate timing and position signals 116 based on the servo data 118 that is read, so that device controllers 105 can controls the operation of the plurality of drive devices based on the timing and position signals 116.

In an embodiment of the present invention, the read/write channel includes a repetition decoder, majority logic detection, matched filter, correlater, integrator and/or maximum likelihood detector for decoding the track identification data 216 and the burst data 218 that is repetition coded. This servo data is used to extract the track number, by gray decoding the track identification data. In addition, subtrack position is determined based on the relative magnitudes of the A, B, C, and D data bursts 218. Further details regarding the subtrack control and positioning are presented in U.S. Pat. No. 6,108, 151, Sampled Amplitude Read Channel for Reading User Data and Embedded Servo Data from a Magnetic Medium, filed on Apr. 25, 1997.

In addition, the servo formatter 120 generates timing information based on the detected servo address mark 220 for use by device controllers 105 for controlling the actuator 108 and spindle motor, and optionally for generating other timing information used by disk formatter 125 and read/write channel 140 in timing of disk write operations. Further details regarding the use of servo address mark 220 in such timing operations are presented in pending U.S. patent application Ser. Nos. 11/311,725 and 11/311,726, filed on Dec. 19, 2005.

While the foregoing description discusses the operation of servo writer 175 as part of the factory setup and initialization of the drive, the functionality of servo writer 175 may optionally be implemented in conjunction with servo formatter 125, read/write channel 140 and read/write heads 104 for subsequent formatting operations of disk drive unit 100 in accordance with the present invention.

Figure 8:
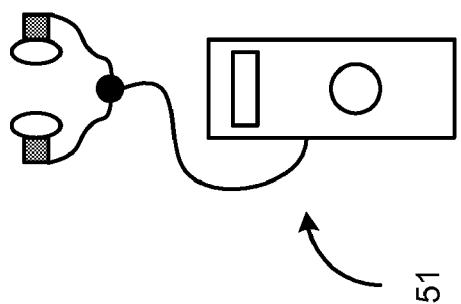
FIG. 8 presents a pictorial representation of a handheld audio unit 51 in accordance with an embodiment of the present invention.

FIG. 8 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 9:
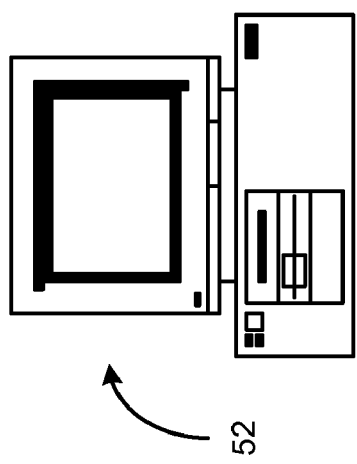
FIG. 9 presents a pictorial representation of a computer 52 in accordance with an embodiment of the present invention.

FIG. 9 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 10:
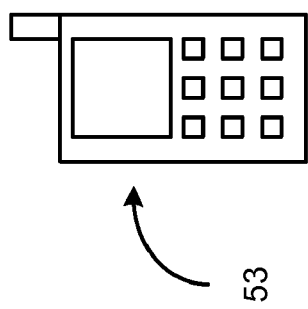
FIG. 10 presents a pictorial representation of a wireless communication device 53 in accordance with an embodiment of the present invention.

FIG. 10 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 11:
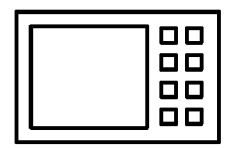
FIG. 11 presents a pictorial representation of a personal digital assistant 54 in accordance with an embodiment of the present invention.

FIG. 11 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 12:
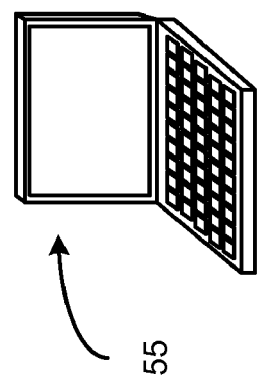
FIG. 12 presents a pictorial representation of a laptop computer 55 in accordance with an embodiment of the present invention.

FIG. 12 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 13:
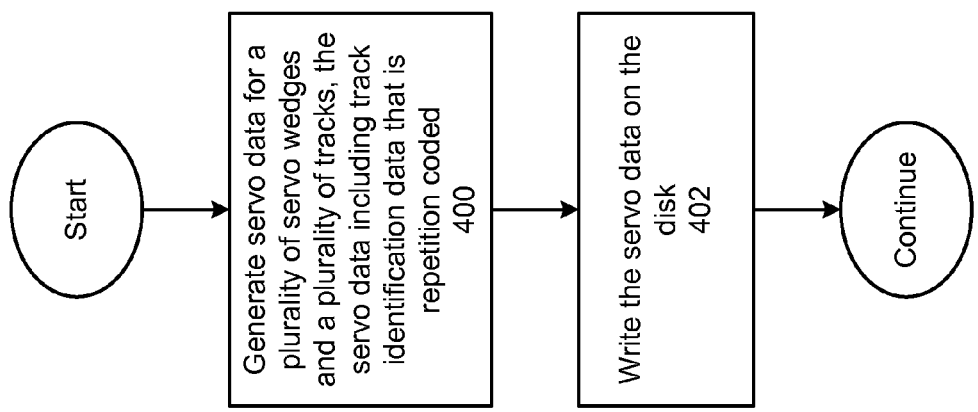
FIG. 13 presents a flowchart representation of a method in accordance with an embodiment of the present invention.

FIG. 13 presents a flowchart representation of a method in accordance with an embodiment of the present invention. In particular, a method is presented that can be used in conjunction with one or more of the features or functions described in association with FIGS. 1-12. In step 400, servo data is generated corresponding to a plurality of servo wedges and a plurality of tracks of a disk, the servo data including track identification data that is repetition coded. In step 402, the servo data is written on the disk.

In embodiments of the preset invention, the track identification data is (4,1) repetition coded, (3,1) repetition coded or coded with another (n,1) repetition code. The step of generating the servo data can also include generating track identification data by gray-coding a track identification number. The servo data can further include a preamble, a servo address mark and at least one burst region. In addition, the step of writing the servo data can include writing to the disk via perpendicular magnetic recording.

Figure 14:
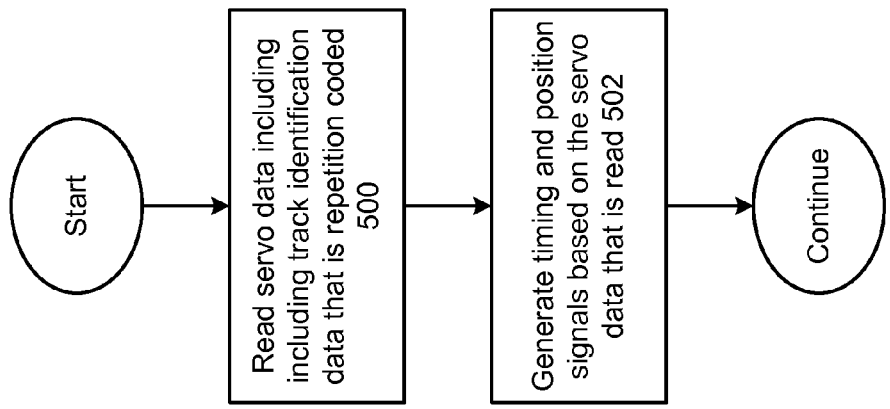
FIG. 14 presents a flowchart representation of a method in accordance with an embodiment of the present invention.

FIG. 14 presents a flowchart representation of a method in accordance with an embodiment of the present invention. In particular, a method is presented that can be used in conjunction with one or more of the features or functions described in association with FIGS. 1-13. In step 500, servo data is read from a plurality of servo wedges and a plurality of tracks of a disk, the servo data including track identification data that is repetition coded. In step 502, the servo data is processed to produce timing and position signals.

In embodiments of the preset invention, the track identification data is (4,1) repetition coded, (3,1) repetition coded or coded with another (n,1) repetition code. The step of reading the servo data can also include reading gray-coded track identification data that includes a track identification number. The servo data can further include a preamble, a servo address mark and at least one burst region. In addition, the step of reading the servo data can include reading perpendicular magnetic recorded data from the disk.

Figure 15:
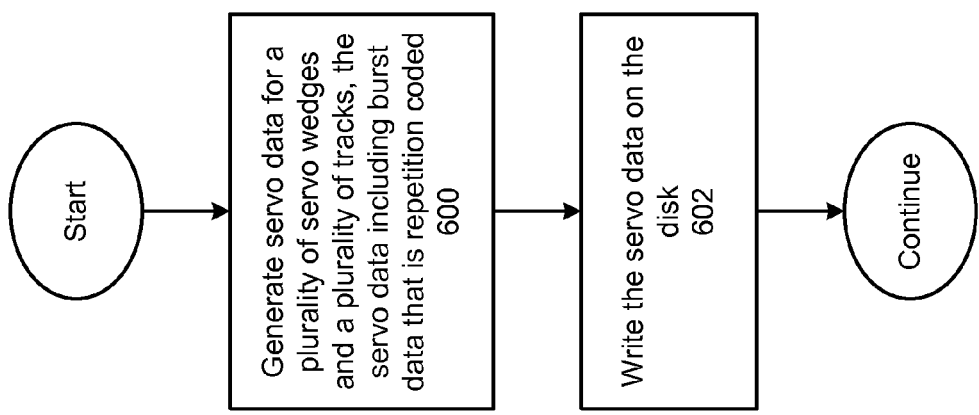
FIG. 15 presents a flowchart representation of a method in accordance with an embodiment of the present invention.

FIG. 15 presents a flowchart representation of a method in accordance with an embodiment of the present invention. In particular, a method is presented that can be used in conjunction with one or more of the features or functions described in association with FIGS. 1-14. In step 600, servo data is generated corresponding to a plurality of servo wedges and a plurality of tracks of a disk, the servo data including burst data that is repetition coded. In step 602, the servo data is written on the disk.

In embodiments of the preset invention, the burst data includes an alternating data stream that is (4,1) repetition coded, or coded with another (n, 1) repetition code, wherein n is greater than 4. The step of generating the servo data can also include generating track identification data by gray-coding a track identification number. The servo data can further include a preamble, a servo address mark and a quad burst region. In addition, the step of writing the servo data can include writing to the disk via perpendicular magnetic recording.

Figure 16:
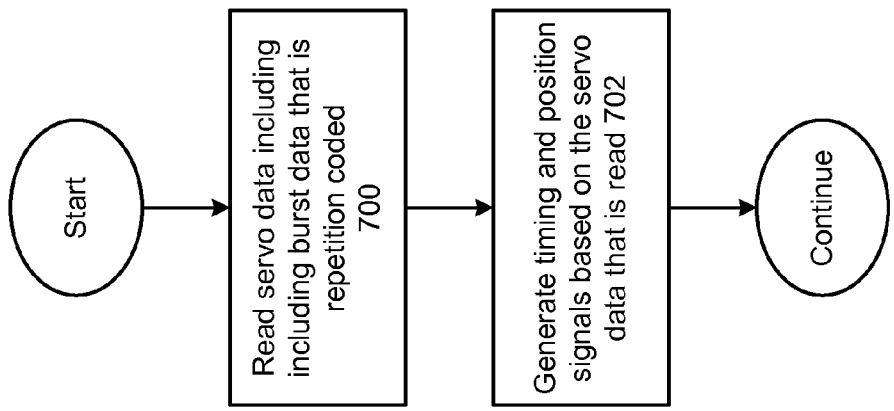
FIG. 16 presents a flowchart representation of a method in accordance with an embodiment of the present invention.

FIG. 16 presents a flowchart representation of a method in accordance with an embodiment of the present invention. In particular, a method is presented that can be used in conjunction with one or more of the features or functions described in association with FIGS. 1-15. In step 700, servo data is read from a plurality of servo wedges and a plurality of tracks of a disk, the servo data including burst data that is repetition coded. In step 702, the servo data is processed to produce timing and position signals.

In embodiments of the preset invention, the burst data includes an alternating data stream that is (4,1) repetition coded, or coded with another (n, 1) repetition code, wherein n is greater than 4. The step of reading the servo data can also include reading gray-coded track identification data that includes a track identification number. The servo data can further include a preamble, a servo address mark and a quad burst region. In addition, the step of reading the servo data can include reading perpendicular magnetic recorded data from the disk.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a memory and a processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A magnetic disk drive comprising:
    a magnetic disk including a plurality of servo wedges and a plurality of tracks, at least one of the plurality of tracks for at least one of the plurality of servo wedges including servo data that is perpendicular magnetic recoded thereon, the servo data including a preamble, a servo address mark, at least one burst region, and a track identification number that is repetition coded by replicating each bit of data with n consecutive identical data bits, where n is an integer great than 1; and
    a read/write head coupled to read the servo data from the magnetic disk.

2. The magnetic disk drive of claim 1 wherein n=4.

3. The magnetic disk drive of claim 1 wherein n=3.

4. The magnetic disk drive of claim 1 wherein the track identification number is Gray coded prior to being repetition coded.

5. A method comprising:
    writing servo data to a disk, the servo data corresponding to a plurality of servo wedges and a plurality of tracks of the disk, the servo data including track identification data that is repetition coded by replicating each bit of the track identification data with n consecutive identical data bits, where n is an integer great than 1.

6. The method of claim 5 wherein n=4.

7. The method of claim 5 wherein n=3.

8. The method of claim 5 wherein the track identification data includes a gray-coded track identification number.

9. The method of claim 5 wherein the servo data further includes a preamble, a servo address mark and at least one burst region.

10. The formatter of claim 5 wherein the step of writing the servo data includes writing to the disk via perpendicular magnetic recording.

11. A method comprising:
   reading servo data from a plurality of servo wedges and a plurality of tracks of a disk, the servo data including track identification data that is repetition coded by replicating each bit of the track identification data with n consecutive identical data bits, where n is an integer great than 1.

12. The method of claim 11 wherein n=4.

13. The method of claim 11 wherein n=3.

14. The method of claim 11 wherein the track identification data includes a gray-coded track identification number.

15. The method of claim 11 wherein the servo data further includes a preamble, a servo address mark and at least one burst region.

16. The formatter of claim 11 wherein the step of reading the servo data includes reading perpendicular magnetic recorded data from the disk.

* * * * *